3,778,508
FEED COMPOSITIONS AND METHODS

Gino J. Marco, Webster Groves, Mo., and Robert B. Grainger, Palm Desert, Calif., assignor to Monsanto Company, St. Louis, Mo.
No Drawing. Filed Nov. 7, 1969, Ser. No. 874,956
Int. Cl. A61k 27/00
U.S. Cl. 424—300          15 Claims

ABSTRACT OF THE DISCLOSURE

Compositions containing at least one compound of the class of dithiocarbamates are useful for improving the growth response in animals.

---

This invention relates to novel compositions and to methods of improving the growth response in animals.

In accordance with this invention, it has been found that certain esters of dithiocarbamic acids are useful growth promoters for animals. Animal diets containing these dithiocarbamates elicit a substantially greater weight gain and feed efficiency response in animals than when said diets are used alone. The growth promoting compounds are also useful for the improvement of carcass quality, for example, as manifested in increased marbling in cattle.

The improved weight gain and feed efficiency response in animals is accomplished in accordance with this invention by a method which comprises administering to the animal a growth promoting amount of at least one compound of the formula $$R-S-\overset{S}{\underset{\|}{C}}-\overset{R^1}{\underset{|}{N}}-R^2$$

wherein:

R is selected from the group consisting of lower alkenyl, halo lower alkenyl, cyclohexenyl and

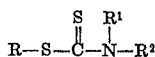

wherein $R^3$ and $R^4$ are each selected from the group consisting of hydrogen and lower alkyl;

$R^1$ is selected from the group consisting of hydrogen, alkyl of not more than 12 carbon atoms, halo lower alkyl, lower alkenyl, halo lower alkenyl, lower alkoxy lower alkyl, hydroxy lower alkyl, benzyl and

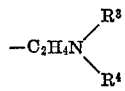

wherein $n$ is an integer from 2 to 4 and $R^5$ and $R^6$ are each selected from the group consisting of hydrogen and lower alkyl;

$R^2$ is selected from the group consistng of hydrogen, alkyl of not more than 12 carbon atoms, halo lower alkyl, lower alkenyl, halo lower alkenyl, hydroxy lower alkyl, cyclohexyl, cyclohexenyl and

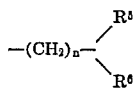

wherein $m$ is an integer from 0 to 1 and $X^1$ and $X^2$ are each selected from the group consisting of hydrogen, chlorine and bromine; and $R^1$ and $R^2$ together with the nitrogen atom is selected from the group consisting of

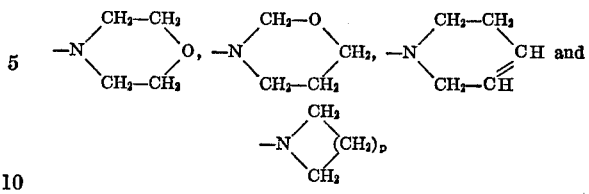

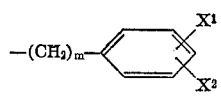

wherein $p$ is an integer from 2 to 6.

The compounds of the above formula are useful for improving the growth response in meat producing animals generally, for example, poultry, swine and ruminants. The compounds are particularly advantageous for improving the growth response in cattle and sheep.

In the above formula R can be, for example, lower alkenyl of not more than 4 carbon atoms such as vinyl, allyl, n-butenyl-2, n-butenyl, n-propenyl-1 and the like, halo lower alkenyl such as 3-chlorallyl, 2-bromovinyl, cis and trans 2,3-dichloroallyl, 2,3,3-tribromoallyl, 4-bromobuten-2-yl, 3-iodoallyl, 2,3-difluoroallyl, 2,3,3-trichloroallyl, 2,3-dichloro-4-bromobutenyl and the like, 2-cyclohexenyl, 3-cyclohexenyl, or aminoethyl such as diethylaminoethyl, methylethylaminoethyl, dibutylaminoethyl, diisopropylaminoethyl and the like.

$R^1$ in the above formula can be, for example, hydrogen, alkyl such as methyl, ethyl, n-propyl, isopropyl, butyl, tert. butyl, pentyl, hexyl, heptyl, octyl, nonyl, decyl, undecyl, dodecyl and the various homologues and isomers of alkyl of not more than 12 carbon atoms, halo lower alkyl such as chloromethyl, iodomethyl, dichloromethyl, bromomethyl, trifluoromethyl, bromoethyl, diiodoethyl, dichloroethyl, chloropropyl, bromopropyl, iodopropyl, chloroisopropyl, bromobutyl, 1,3,3-trichlorobutyl, chlorotert-butyl and the like, lower alkoxy lower alkyl such as methoxymethyl, ethoxymethyl, propoxymethyl, butoxymethyl, methoxyethyl, ethoxypropyl, butoxypropyl, methoxybutyl, propoxybutyl, butoxybutyl and the like, hydroxy lower alkyl such as hydroxymethyl, hydroxyethyl, hydroxisopropyl, hydroxybutyl and the like, benzyl, lower alkylamino such as aminoethyl, aminopropyl, aminobutyl, dimethylaminoethyl, methylpropylaminoethyl, dibutylaminopropyle, diethylaminobutyl, ethylpropylaminobutyl and the like and lower alkenyl and lower halo alkenyl as described above for R.

$R^2$ in the above formula can be, for example, hydrogen, alkyl, halo lower alkyl, lower alkenyl, halo lower alkenyl, hydroxy lower alkyl as described above for $R^1$, cyclohexyl, cyclohexenyl, phenyl, substituted phenyl having up to 2 substituents selected from chlorine and bromine, benzyl and substituted benzyl having up to 2 substituents selected from chlorine and bromine.

In the above formula $R^1$ and $R^2$ together with the nitrogen atom can constitute a cyclic group, for example, morpholino, 1,2,3,6-tetrahydropyridinyl, tetrahydro-1,3-oxazinyl-3 and saturated cyclic groups having at least 4 and not more than 8 ring carbon atoms such as piperidino, 1-pyrrolidinyl, octahydro-1H-azoninyl and the like.

The compounds of the above formula possess animal growth promoting properties and are useful in the practice of this invention. Preferred compounds of the above formula which are particularly advantageous are those where the halo substituents on the R, $R^1$ and $R^2$ groups are chlorine or bromine, preferably those groups having not more than 3 halogen atoms. Particularly preferred compounds are those where $R^1$ and $R^2$ are other than hydrogen. More particularly preferred are the compounds where R is cyclohexenyl and $R^1$ and $R^2$ are both alkyl, for example, 2-cyclohexenyl N,N-diisopropyldithiocarbamate.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the dithiocarbamates is the change in propionic acid content in the rumen fluids. An increase in the propionic acid content in the rumen fluid indicates that a desirable response in overall ruminant performance has been brought about by the dithiocarbamates in the feed compositions. These in vitro observations have been confirmed by long-term in vivo feeding of ruminants in which weight gain and feed efficiency are measured.

In the examples of the present invention which follow, evaluation of the dithiocarbamates is made (1) in vitro and (2) in vivo. The in vitro rumen fluids are analyzed by a gas chromatographic procedure to determine the change of propionic acid content therein. The change in propionic acid content is expressed as percent of the propionic acid content found in the control rumen fluid. In other examples long-term in vivo feeding studies are used to show improved animal performance.

The following examples, in which parts and percent are expressed by weight unless otherwise indicated, further illustrate the advantages of this invention.

EXAMPLE 1

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alpha-cellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (7 to 8 hours) is taken, filtered through four layers of cheesecloth and 10 ml. of the fluid charged to each flask. A buffer solution of the following composition is prepared and adjusted to pH 6.8 with aqueous 4 N HCl.

| | Buffer solution in grams per liter |
|---|---|
| $NaH_2PO_4$ | .316 |
| $KH_2PO_4$ | .152 |
| $NaHCO_3$ | 2.260 |
| KCl | .375 |
| NaCl | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated at 39° C. ±0.5° C. on a water shaker bath. The fermentation mixtures are incubated for 16 hours and then analyzed to determine the propionate response. Results are given below in Table I.

TABLE I

| Compound: | Propionate response, percent control |
|---|---|
| Control | 100 |
| Allyl dithiocarbamate | 107 |
| Cis and trans 2,3-dichloroallyl dithiocarbamate | 107 |
| 2,3,3-trichloroallyl dithiocarbamate | 188 |
| 2-cyclohexenyl dithiocarbamate | 155 |
| 2 - dimethylaminoethyl N - methyldithiocarbamate | 118 |
| 2-aminoethyl N - 3 - methoxypropyldithiocarbamate | 109 |
| 2 - dimethylaminoethyl N - 1,1,3,3 - tetramethylbutyldithiocarbamate | 150 |
| 2-dimethylaminoethyl N-nonyldithiocarbamate | 131 |
| Allyl N-nonyldithiocarbamate | 120 |
| 2 - chloroallyl N-3-dimethylaminopropyldithiocarbamate | 129 |
| 2,3-dichloroallyl N-methyldithiocarbamate | 122 |
| 2-cyclohexenyl N-allyldithiocarbamate | 128 |
| 2-cyclohexenyl N - 2 - cyclohexenyldithiocarbamate | 113 |
| 2 - cyclohexenyl N-3-methoxypropyldithiocarbamate | 144 |
| 2-chloroallyl N-propyldithiocarbamate | 155 |
| 2-diethylaminoethyl N-ethyldithiocarbamate | 117 |
| 2-dimethylaminoethyl N,N - dibenzyldithiocarbamate | 192 |
| 2 - dimethylaminoethyl N,N - dioctyldithiocarbamate | 140 |
| 2 - dimethylaminoethyl N,N - dioctyldithiocarbamate | 128 |
| Allyl N-allyl N-isopropyldithiocarbamate | 143 |
| Allyl N,N-diallyldithiocarbamate | 125 |
| Allyl N - cyclohexyl N-2-diethylaminoethyldithiocarbamate | 177 |
| Allyl N(2 - dimethylaminoethyl)dithiocarbanilate | 140 |
| Allyl N-allyl 3,4-dichlorodithiocarbanilate | 153 |
| 2 - chloroallyl N,N - bis(2 - hydroxyethyl)dithiocarbamate | 106 |
| 2-bromoallyl N,N-diethyldithiocarbamate | 131 |
| 2-chloroallyl N,N-diethyldithiocarbamate | 141 |
| 2 - dimethylaminoethyl N-methyl N-cyclohexyldithiocarbamate | 136 |
| 2-cyclohexenyl N,N-dimethyldithiocarbamate | 138 |
| 2-cyclohexenyl N-pentyldithiocarbamate | 118 |
| Allyl N-2-cyclohexenyldithiocarbamate | 143 |
| Allyl N-2-methoxyethyldithiocarbamate | 111 |
| 2-diethylaminoethyl N-nonyldithiocarbamate | 150 |
| 3,3 - dichloroallyl N,N - diisopropyldithiocarbamate | 114 |
| 2-cyclohexenyl N-methyldithiocarbamate | 134 |
| 2,3-dichloroallyl N-isopropyldithiocarbamate | 118 |
| Allyl N-1,3-dimethylbutyldithiocarbamate | 119 |
| 2-diethylaminoethyl N - 3 - methoxypropyldithiocarbamate | 111 |
| Allyl N-nonyldithiocarbamate | 120 |
| 2 - dimethylaminoethyl N,N - dibutyldithiocarbamate | 128 |
| 2-chloroallyl N,N-diisopropyldithiocarbamate | 134 |
| 2-diethylaminoethyl 1-pyrrolidinecarbodithioate | 107 |
| 2 - diethylaminoethyl hexamethyleneiminecarbodithioate | 156 |
| Allyl tetrahydro-1,3-oxazine-3-carbodithioate | 120 |
| Allyl N-isodecyl dithiocarbamate | 108 |
| Allyl N-propyldithiocarbamate | 112 |
| Allyl N-allyldithiocarbamate | 111 |
| Allyl N-sec. butyldithiocarbamate | 115 |

TABLE 1—Continued

Compound: Propionate response, percent control
Allyl N-cyclohexyldithiocarbamate _____ 113
2-cyclohexenyl 1-pyrrolidinecarbodithioate _____ 118
2-chloroallyl 1-pyrrolidinecarbodithioate _____ 121
Allyl hexamethyleneiminecarbodithioate _____ 124
2-chloroallyl 4-morpohlinecarbodithioate _____ 102
Allyl 1-piperidinecarbodithioate _____ 138
Allyl 1,2,3,6-tetrahydropyridylcarbodithioate ____ 141
2-cyclohexenyl N,N-diisopropyldithiocarbamate __ 107

A basal ration having approximately the following composition was used in Examples 2, 3 and 4.

Component: Percent
Cracked corn _____ 43.3
Soybean meal (50% protein) _____ 18.0
Molasses _____ 10.0
Trace minerals _____ 0.1
Iodized salt _____ 0.5
Ground corn cobs _____ 3.5
Defluorinated phosphate _____ 1.34
Ground limestone _____ 1.16
Cottonseed hulls _____ 22.0
Vitamin A and D _____ .1

EXAMPLE 2

A number of sheep feeding studies were carried out with the above basal ration and the various dithiocarbamates listed below in Table II. In each study one group of sheep was fed the basal ration without a dithiocarbamate additive to serve as the control. Feed efficiency was determined from the average daily weight gain and average daily feed consumption for each group of sheep self-fed over a twenty-one day period. The feed efficiency as percent of the control is set forth in Table II. The dithiocarbamates were incorporated into the basal ration at a level of 0.005% by weight of the ration.

TABLE II

Compound: Feed efficiency percent of control
Control _____ 100
Allyl dithiocarbamate _____ 103
3-chloroallyl N-ethyldithiocarbanilate _____ 106
Allyl N-isodecyldithiocarbamate _____ 107
2 - cyclohexenyl N-3-methoxypropyldithiocarbamate _____ 154

EXAMPLE 3

Following the procedure of Example 2, a number of sheep feeding studies were carried out using the basal ration containing 0.0005% weight of the dithiocarbamates set forth in Table III.

TABLE III

Compound: Feed efficiency percent of control
Control _____ 100
2,3,3-trichloroallyl dithiocarbamate _____ 114
Allyl hexamethyleneiminecarbodithioate _____ 115
2-cyclohexenyl N,N-dimethyldithiocarbamate ___ 127
Allyl N-nonyldithiocarbamate _____ 109
2-diethylaminoethyl N,N-diisopropyldithiocarbamate _____ 138
Allyl N-allyl N-isopropyldithiocarbamate _____ 104

EXAMPLE 4

Numerous groups of sheep were self-fed for 21 days the above basal ration containing 0.005% and 0.0005% by weight of the dithiocarbamates set forth in Table IV. The feed efficiency of the test groups is reported in the table as percent of the control group which was fed the basal ration without any additive.

TABLE IV

| Compound | Additive, percent concentration | Feed efficiency, percent control |
|---|---|---|
| Control | | 100 |
| 2-bromoallyl N,N-diethyldithiocarbamate | 0.005 | 129 |
| | 0.0005 | 120 |
| 2-chloroallyl N,N-diethyldithiocarbamate | 0.005 | 100 |
| | 0.0005 | 109 |
| Allyl N,N-diallyldithiocarbamate | 0.005 | 106 |
| | 0.0005 | 134 |
| 2-chloroallyl 1-pyrrolidinecarbodithioate | 0.005 | 122 |
| | 0.0005 | 105 |
| Allyl 1-piperidinecarbodithioate | 0.005 | 134 |
| | 0.0005 | 154 |
| Allyl 1,2,3,6-tetrahydropyridylcarbodithioate | 0.005 | 134 |
| | 0.0005 | 122 |
| Allyl tetrahydro 1,3-oxazine-3-carbodithioate | 0.005 | 116 |
| | 0.0005 | 104 |
| Allyl N-cyclohexyl N-2-diethylaminoethyldithiocarbamate | 0.005 | 118 |
| | 0.0005 | 106 |
| Allyl N-2-dimethylaminoethyldithiocarbamate | 0.005 | 104 |
| | 0.0005 | 134 |
| Allyl N-allyldithiocarbamate | 0.005 | 120 |
| | 0.0005 | 113 |
| 2-chloroallyl N-3-dimethylaminoethyldithiocarbamate | 0.005 | 104 |
| | 0.0005 | 118 |
| 2-cyclohexenyl N-allyldithiocarbamate | 0.005 | 120 |
| | 0.0005 | 127 |
| 2-dimethylaminoethyl N,N-diisopropyldithiocarbamate | 0.005 | 106 |
| | 0.0005 | 108 |
| 2-dimethylaminoethyl N,N-dioctyldithiocarbamate | 0.005 | 134 |
| | 0.0005 | 145 |
| 2-dimethylaminoethyl N,N-dibenzyldithiocarbamate | 0.005 | 138 |
| | 0.0005 | 167 |
| 2-dimethylaminoethyl hexamethyleneiminecarbodithioate | 0.005 | 143 |
| | 0.0005 | 117 |

A basal ration having approximately the following composition was used in Example 5.

Component: Percent
Chopped alfalfa hay _____ 14.5
Steam rolled milo _____ 74.0
Molasses _____ 8.0
NaCl _____ 0.5
Defluorinated phosphate _____ 0.8
Trace minerals _____ 0.1
Vitamin $A+D$ _____ 0.1
Ground milo/additive premix [1] _____ 2.0

[1] Two and one-half pounds premix containing the chemical additive mixed with 47.5 lbs. ground milo.

EXAMPLE 5

Four groups of cattle were self-fed the above basal ration for 84 days. One group was fed the basal ration without any additive to serve as the control. The other groups were fed the basal ration containing 0.0008, 0.0016 and 0.0024 percent by weight of 2-cyclohexenyl N,N-diisopropyldithiocarbamate, respectively. The average daily weight gain and feed efficiency was determined and is set forth below in Table V.

TABLE V

| Additive, percent concentration | Average daily gain, lbs. | Feed efficiency, feed/gain |
|---|---|---|
| None (control) | 2.60 | 6.74 |
| 0.0008 | 2.92 | 6.47 |
| 0.0016 | 2.97 | 5.98 |
| 0.0024 | 2.87 | 6.58 |

The dithiocarbamates useful in this invention are incorporated in animal feed compositions in an effective amount over a wide range of concentrations. Significant animal responses are obtained with daily rations containing from about 0.0001% by weight to about 0.1% by weight of the dithiocarbamates. Preferably, the daily ration contains from about 0.005% by weight to about 0.05% by weight of the dithiocarbamates.

Based on a fattening lamb consuming about 3 pounds of ration per day and cattle each consuming about 20 pounds of ration per day, the dithiocarbamates are administered to sheep in an amount from about 0.0013 gm. to about 1.3 gm. per head per day, and to cattle in an amount from about 0.009 gm. to about 9.0 gm. per head per day. The dithiocarbamates are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed. Accordingly, the dithiocarbamates are administered to meat-producing animals in a daily amount of about 0.04 mg. to about 80 mg. per kg. body weight. Preferably the dithiocarbamates are administered to animals in a daily amount of about 0.04 mg. to about 40 mg. per kg. body weight.

The oral administration of the dithiocarbamates in accordance with this invention can be accomplished in the form of tablets, capsules, powders, solutions, suspensions or in admixture with one or more components of the animal's diet. Alternatively, the dithiocarbamates can be administered in an equivalent amount in a liquid carrier such as the animal's drinking water.

The novel animal feed premixes according to this invention comprise from about 0.1 to about 90 percent by weight of the dithiocarbamate and a nutritious feedstuff or by-product feedstuff. The dithiocarbamate is present in the premix in sufficient quantity to give the desired ratio of the dithiocarbamate to feed in the final ration fed to animals. For example, approximately 1 pound of 2-cyclohexenyl N,N-diisopropyldithiocarbamate is blended with 99 pounds of ground milo in a conventional apparatus used for the preparation of dry feed mixes. Approximately three pounds of this premix is then blended with one ton of a balanced feed composition to provide a ration containing approximately 0.0015% by weight of 2-cyclohexenyl N,N-diisopropyldithiocarbamate in the animal ration.

The suitable feedstuff present in the premixes of this invention can be any nutritious feedstuff or by-product feedstuff. Illustrative of the feedstuff or by-product feedstuff used as a carrier in the novel premixes are hay, grains, dehydrated alfalfa, ground corn, oat hulls, ground milo, soybean meal, fish meal, cottonseed meal, linseed meal, wheat middlings, corn gluten meal, distillers dried grains, molasses, soybean oil, peanut oil, corn oil, sesame oil and the like. An oil solution or emulsion lends itself to spraying on the basal ration and is particularly adapted for liquid compositions including drinking water. In addition to the dithiocarbamate and the nutritious feedstuff or by-product feedstuff the premixes in accordance with this invention can also contain stabilizers and other feed additives such as vitamins, antibiotics, minerals, hormones, steroids and other feed supplements of this nature. The premix can be supplied to grain mills or feed manufacturers who then incorporate the premix into the finished diet to be supplied to the animals by the farmer.

The feed compositions of this invention are suitable animal feeds containing a growth-promoting amount of at least one compound of the above formula, as illustrated by the basal rations fully described hereinabove.

The feed compositions of this invention can be prepared by incorporating the dithiocarbamate in various ways into the conventional components of the diet for the type of animal in question. The dithiocarbamates can be added to the diet ration as pure compounds or in the form of a premix. The premixes of this invention are particularly desirable for the incorporation of the active dithiocarbamate in the feed composition.

An essential component in animal feeds is the cellulosic component. By the expression "cellulosic component" it is intended to refer to any nutrient component which contains at least 2% fiber. The fiber is principally cellulose which may also contain lignin chemically bound thereto. Typical fiber containing feeds include hay, straw, cottonseed hulls, cotton mill wastes, beet pulp, silage, corn, barley, alfalfa seed, oats, corn stalks, cereal brans, cereal middlings and the like. One or more of these cellulosic components is essential in balanced feed compositions and at least 2% by weight is included and as much as 99.99% or more can be used. However, in some areas animals are fed diets consisting essentially of barley and/or oats or substantially entirely of these high fiber cereals.

In the preparation of the animal feed compositions of this invention at least one cellulosic component is preferably present in excess of 2% by weight although it usually greatly exceeds this preferred minimum content. These fiber containing components are conventional in animal feeds and aid the digestion of the nutrients in the balanced ration.

The animal feeds may contain natural oils including animal fats, such as beef tallow, mutton tallow; fish oils including eel, herring, menhaden, tuna and salmon oils; and vegetable oils. The vegetable oils are usually liquid, for example, soybean oil, sunflower oil, olive oil, safflower oil, corn oil, peanut oil, cottonseed oil, rice oil, millet oil, wheat germ oil and palm oil. Any of these can be included in the feed.

An optional component of the animal feeds is a non-toxic antioxidant. These substances tend to preserve vitamins and the unsaturation in oils by preventing the oxidation which normally occurs during the storage and use of the animal feeds. In the feed compositions the use of from 0.001 to 0.1% by weight of the non-toxic antioxidant has been found to be satisfactory.

Complete balanced feeds can contain, if desired, in addition to the cellulosic component and the dithiocarbamate, the natural oils, antioxidants, minerals such as bone meal, salt and the various trace minerals including salts of zinc, copper, manganese, magnesium, cobalt, iodine and iron. Antibiotics, steroids, anthelmintics and other medicaments can be used. Various vitamins particularly A, B, E, and D complexes can be added to provide for the deficiencies in these vitamins incident to the selection of the various components of the complete feed. Stilbestrol is another optional component. Other basic nutrients such as casein, other milk by-products and urea can be used if desired or if they are necessary to satisfy the requirements of the complete ration.

The dithiocarbamates also cen be administered to the animals subcutaneously or intramuscularly in the form of solutions, pastes or pellets, but it is generally more convenient to use the active materials in the animal's feed composition.

The dithiocarbamates useful in the practice of this invention can be prepared by processes known to those skilled in the art. In general, the dithiocarbamates are prepared by condensing a salt of the appropriate dithiocarbamic acid with a halide containing the desired ester forming radical. The salts of the dithiocarbamic acids can be conveniently prepared, for example, by the addition of carbon bisulfide to a stirred solution containing the appropriate amine and sodium hydroxide in a suitable reaction medium.

The following illustrates in detail typical preparations of the dithiocarbamates useful in the practice of this invention.

EXAMPLE 6

To a stirred solution of 25.3 grams of diisopropylamine and 40 grams of 25% sodium hydroxide in 250 ml. of water was added dropwise at 20–25° C. 19 grams of carbon bisulfide. After the addition was complete, which required about 15 minutes, the product was stirred for an hour and then 40.3 grams of 3-bromocyclohexene was added in one portion. An exothermic reaction resulted. The mixture was stirred for 24 hours, cooled to 0° C., the precipitate filtered, washed with water until neutral and air dried. The 2-cyclohexenyl N,N-diisopropyldithiocarbamate thus obtained was a cream colored solid melting at 55–57° C. after recrystallization from ethyl alcohol.

EXAMPLE 7

To a stirred solution of 14.4 grams (0.1 mole) of N,N,N'-triethylethylene diamine and 16 grams (0.1 mole) of 25% sodium hydroxide in 200 ml. of water was added dropwise 7.6 grams (0.1 mole) of carbon bisulfide at 5-15° C. and then stirred for 1 hour. Then 11.1 grams (0.1 mole) of 2,3-dichloro-1-propene was added in one portion and stirred for 24 hours at 25-30° C. and extracted with 400 ml. of ethyl ether. The ether solution was washed with water until neutral to litmus, dried over sodium sulfate and the ether removed in vacuo at a maximum temperature of 80–90° C. at 1–2 mm. The 2-chloroallyl N-diethylaminoethyl N-ethyldithiocarbamate was obtained in 99% yield as an amber oil.

Additional details of the preparation of the compounds useful in this invention can be readily found, for example, by referring to U.S. Pats. 2,919,182; 3,078,273 and 3,098,901.

Although this invention has been described by the foregoing examples, it will be apparent that various equivalent changes and modifications may be resorted to without departing from the spirit and scope thereof, and it is understood that such equivalent embodiments are intended to be included herein.

The embodiments of the invention in which an exclusive property or privilege is claimed are defined as follows:

1. A method of improving the growth response in an animal selected from the group consisting of poultry, swine and ruminants which comprises orally administering to said animal a growth-promoting amount of a compound of the formula $$R-S-\overset{S}{\underset{\|}{C}}-\overset{R^1}{\underset{|}{N}}-R^2$$

wherein:

R is selected from the group consisting of lower alkenyl, halo lower alkenyl, cyclohexenyl and $$-C_2H_4N\overset{R^3}{\underset{R^4}{\diagdown}}$$

wherein $R^3$ and $R^4$ are each selected from the group consisting of hydrogen and lower alkyl;
$R^1$ is selected from the group consisting of hydrogen, alkyl of not more than 12 carbon atoms, halo lower alkyl, lower alkenyl, halo lower alkenyl, lower alkoxy lower alkyl, hydroxy lower alkyl, benzyl and $$-(CH_2)_n-N\overset{R^5}{\underset{R^6}{\diagdown}}$$

wherein $n$ is an integer from 2 to 4 and $R^5$ and $R^6$ are each selected from the group consisting of hydrogen and lower alkyl;
$R^2$ is selected from the group consisting of hydrogen, alkyl of not more than 12 carbon atoms, halo lower alkyl, lower alkenyl, halo lower alkenyl, hydroxy lower alkyl, cyclohexyl, cyclohexenyl and $$-(CH_2)_m-\underset{X^2}{\overset{X^1}{\diagup}}$$

wherein $m$ is an integer from 0 to 1 and $X^1$ and $X^2$ are each selected from the group consisting of hydrogen, chlorine and bromine.

2. The method of claim 1 wherein R is cyclohexenyl.
3. The method of claim 1 wherein R is allyl.
4. The method of claim 1 wherein $R^1$ is alkyl and $R^2$ is alkyl.
5. A method of improving the growth response in an animal selected from the group consisting of poultry, swine, and ruminants which comprises feeding said animal a feed composition comprising a growth-promoting amount of a compound of the formula $$R-S-\overset{S}{\underset{\|}{C}}-\overset{R^1}{\underset{|}{N}}-R^2$$

wherein:

R is selected from the group consisting of lower alkenyl, halo lower alkenyl, cyclohexenyl and $$-C_2H_4N\overset{R^3}{\underset{R^4}{\diagdown}}$$

wherein $R^3$ and $R^4$ are each selected from the group consisting of hydrogen and lower alkyl;
$R^1$ is selected from the group consisting of hydrogen, alkyl of not more than 12 carbon atoms, halo lower alkyl, lower alkenyl, halo lower alkenyl, lower alkoxy lower alkyl, hydroxy lower alkyl, benzyl and $$-(CH_2)_n-N\overset{R^5}{\underset{R^6}{\diagdown}}$$

wherein $n$ is an integer from 2 to 4 and $R^5$ and $R^6$ are each selected from the group consisting of hydrogen and lower alkyl;
$R^2$ is selected from the group consisting of hydrogen, alkyl of not more than 12 carbon atoms, halo lower alkyl, lower alkenyl, halo lower alkenyl, hydroxy lower alkyl, cyclohexyl, cyclohexenyl and $$-(CH_2)_m-\underset{X^2}{\overset{X^1}{\diagup}}$$

wherein $m$ is an integer from 0 to 1 and $X^1$ and $X^2$ are each selected from the group consisting of hydrogen, chlorine and bromine.

6. The method of claim 5 wherein the animal is a ruminant.
7. The method of claim 5 wherein R is lower alkenyl.
8. The method of claim 5 wherein R is 2-cyclohexenyl and $R^2$ is hydrogen.
9. The method of claim 5 wherein $R^1$ is alkyl and $R^2$ is alkyl.
10. The method of claim 5 wherein R is halo lower alkenyl and $R^2$ is hydrogen.
11. The method of claim 6 wherein the compound is 2-cyclohexenyl, N,N-diisopropyldithiocarbamate.
12. The method of claim 6 wherein the compound is 2-bromoallyl N,N-diethyldithiocarbamate.
13. The method of claim 6 wherein the compound is allyl N,N-diallyldithiocarbamate.
14. The method of claim 6 wherein the compound is 2-cyclohexenyl N-allyldithiocarbamate.
15. The method of claim 6 wherein the compound is ally N-2-dimethylaminoethyldithiocarbanilate.

References Cited
UNITED STATES PATENTS

| | | | |
|---|---|---|---|
| 2,905,586 | 9/1959 | Harman | 424—300 |
| 2,997,382 | 8/1961 | Harman et al. | 424—300 |
| 3,078,273 | 2/1963 | Harman et al. | 424—999 |

ALBERT T. MEYERS, Primary Examiner

F. E. WADDELL, Assistant Examiner

U.S. Cl. X.R.

424—244, 248, 263, 267, 274